United States Patent Office 3,073,799
Patented Jan. 15, 1963

---

3,073,799
RESIN COMPOSITIONS AND THEIR PREPARATION
Russell A. Skiff, Whittier, Calif., assignor to General Electric Company, a corporation of New York
No Drawing. Filed Jan. 20, 1958, Ser. No. 709,803
7 Claims. (Cl. 260—47)

This invention relates to new and useful resin compositions. More particularly, the invention relates to resin compositions having desirable physical, chemical and electrical properties, including exceptional physical and electrical properties at high temperatures.

Epoxy, epoxide or ethoxyline resins, as they are variously called, are well known in the art. Generally, such epoxy resins comprise a polyether derivative of a polyhydric organic compound, said derivative containing 1,2-epoxy groups, said compound being selected from the class consisting of polyhydric alcohols and phenols containing at least two phenolic hydroxy groups. For example, U.S. Patent 2,324,483 to Castan discloses epoxy resin compositions comprising the reaction product of phenols having at least two phenolic hydroxy groups and an apihalogenohydrin such as epichlorohydrin, the product having at least two epoxy groups and being cured to a thermoset, infusible mass by the use of a carboxylic or polybasic acid or acid anhydride such as phthalic anhydride. While epoxy resins cured with the above materials have found widespread use, their curing time is excessively long being in the order of several hours to a number of days at temperatures of 150° C. and higher. Many epoxy resins cured with these agents are furthermore characterized by poor heat resistance, particularly at temperatures of 200° C. and higher. In general, epoxy resins cured in this manner have poor flame resistant properties unless special additional components such as chlorine containing compounds are introduced into the composition. The polybasic acid and acid anhydride curing agents furthermore have toxic characteristics and special care must be taken in their handling.

The use of organic amine type materials to cure epoxy resins are well known as set forth, for example, in Patent 2,444,333 or $BF_3$-amine complex materials as disclosed, for example, in Patent 2,717,885. However, epoxy resins cured with these basic or amine type curing agents are in general characterized by the same defects which attach to those cured with polybasic acids or anhydrides, as for example their toxicity or ability to cause dermatitis.

A principal object of this invention is to provide epoxy resin compositions which are characterized by favorable physical, electrical and chemical properties at elevated temperatures.

Briefly, this invention comprises epoxy resin compositions having as a curing agent boron oxide or boric oxide ($B_2O_3$). The compositions of the invention are characterized by very rapid curing, curing at relatively low temperatures which is combined with a favorably long pot life of several days. The heat resistance of the cured epoxy resins at elevated temperatures is exceptionally good as are the heat distortion qualities, flame resistance and electrical characteristics.

The ethoxyline resins used in conjunction with my invention are, as pointed out above, well known in the art. They are described in Castan United States Patents Nos. 2,324,483 and 2,444,333, British Patent No. 518,057 and British Patent No. 579,698. Generally, the ethoxyline resins described therein are the reaction product of an epihalogenohydrin such as epichlorohydrin and a phenol having at least two phenolic hydroxy groups such as bis-(4-hydroxy phenyl)-2,2 propane. United States Patents Nos. 2,494,295; 2,500,600 and 2,511,913 describe further ethoxyline resins which can be used in conjunction with my invention. The above patents are hereby incorporated by reference in this application. The ethoxyline resins used herein have more than one epoxy group per molecule. They can be prepared by reacting a polyhydroxy alcohol or phenol such as hydroquinone, resorcinol, glycerine and condensation products of phenols with ketones, for example, bis-(4-hydroxy phenyl)-2,2-propane with epichlorohydrin. The reaction of epichlorohydrin with bis-(4-hydroxy phenyl)-2,2-propane is as follows:

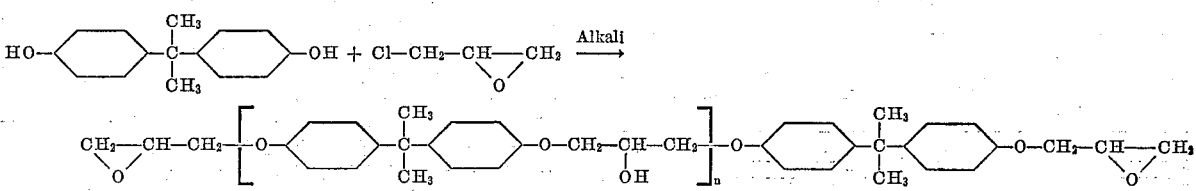

where $n$ has an average value ranging from 0 to about 10. Such ethoxyline resins are sold under the name of Epon by Shell Chemical Corporation, under the name Araldite by the Ciba Company, as ERL resins by the Bakelite Company, and as Epi-Rez resins by the Devoe-Raynolds Company. The data given below for such resins is representative.

Table I

| Epoxy Resin | Epoxide Equivalent | M.P., ° C. |
|---|---|---|
| Epon 828 | 192 | 9 |
| Epon 834 | 225–290 | 20–28 |
| Epon 1064 | 300–375 | 40–45 |
| Araldite 6010 | 192 | (¹) |
| Araldite 6020 | 200–205 | (¹) |
| ERL 2774 | 175–200 | (¹) |
| Epi-Rez 510 | 175–200 | (¹) |

¹ Liquid.

Boron oxide is, of course, a well known material. No special precautions are necessary in using it except the exercise of ordinary care to keep it as dry as possible until used. Boron oxide, when compared to the polybasic acids or anhydrides or to the amine curing agents normally used in curing epoxy resins, is particularly nontoxic. It is neither absorbed through nor does it affect the skin and furthermore will not produce toxic symptoms unless actually ingested.

It has been found that for each 100 parts by weight of epoxy resin up to about 80 parts of boron oxide may advantageously be used. In preparing the present epoxy resin compositions, the boron oxide is simply added to the resin.

Shown in Table II below are various compositions by weight of Epon 828 resin and boron oxide showing all proportions being parts by weight showing the curing time of each composition at various temperatures as shown.

Table II

| Example | Epon 828 Resin (Parts by weight) | $B_2O_3$ (Parts by weight) | Curing Time @ 100° C. (minutes) | Curing Time @ 150° C. (minutes) | Curing Time @ 200° C. (minutes) |
|---|---|---|---|---|---|
| 1 | 100 | 5 | | 64 | 64 |
| 2 | 100 | 10 | | 46 | 46 |
| 3 | 100 | 20 | 20 | 14 | 10 |
| 4 | 100 | 30 | 8 | 4 | 4 |
| 5 | 100 | 40 | 8 | 4 | 4 |
| 6 | 100 | 80 | 8 | 2 | 2 |

The usable pot life of all of the above mixtures was approximately 2 to 3 days at room temperature.

The physical characteristics, particularly at elevated temperatures of the resins, compositions of the present invention, are particularly desirable. The heat distortion points of test bars ½″ x ½″ x 5″ of the present compositions were determined according to ASTM D648–45T. Shown in Table III below are the results of such heat distortion tests on several compositions which had been treated before testing respectively for 24 hours at 150° C. and 24 hours at 200° C.

Table III

| Example | Epon 828 Resin (Parts by weight) | $B_2O_3$ (Parts by weight) | Heat Treatment before testing | Heat Distortion Temperature, 5° C. |
|---|---|---|---|---|
| 7 | 100 | 30 | 24 hrs. at 150° C | 161.5 |
| 8 | 100 | 30 | 24 hrs. at 200° C | 175 |
| 9 | 100 | 80 | 24 hrs. at 150° C | 186 |
| 10 | 100 | 80 | 24 hrs. at 200° C | 200 |

The compositions of Examples 7 and 9 above in Table III were tested for tensile and flexural strength according to ASTM test method No. D790–45T, the test samples being heat treated for 24 hours at 150° C. before testing. Shown in Table IV below are the tensile strengths and flexural strengths of such samples, each figure being an average obtained from three test bars.

Table IV

| Example | Epon 828 Resin (Parts by weight) | $B_2O_3$ (Parts by weight) | Tensile Str. (p.s.i.) | Flexural Str. (p.s.i.) |
|---|---|---|---|---|
| 7 | 100 | 30 | 4,000 | 9,250 |
| 9 | 100 | 80 | 3,000 | 8,300 |

The thermal stability of the present epoxy resin boron oxide compositions was determined by filling aluminum weighing dishes with various mixtures of the compositions and recording the weight loss after heat aging at 200° C. for various periods of time. Shown in Table V below is the weight loss after aging at 200° C. for various periods as shown of various epoxy-boron oxide compositions.

Table V

| Example | Epon 828 Resin (Parts by weight) | $B_2O_3$ (Parts by weight) | Weight Loss at 200° C. (Percent) | | |
|---|---|---|---|---|---|
| | | | 24 hrs. | 500 hrs. | 1,200 hrs. |
| 10 | 100 | 10 | 1.68 | 2.25 | 2.54 |
| 11 | 100 | 30 | .24 | .82 | 1.26 |
| 12 | 100 | 80 | .09 | .70 | 1.17 |

The very favorable low weight losses shown in Table V and above are particularly good when compared with those for epoxy resins using other types of curing agents. For example, when a 50–50 mixture of Araldite 6020 and hexachloroendomethylenetetrahydrophthalic anhydride were heat treated for 500 hours at 200° C., the weight loss was 12.9%. When a 10 to 1 mixture of Epon 828 and benzyldimethylamine was heat treated for the same period of time, the weight loss was 7.2%. When a 10 to 3 mixture of Araldite 6020 and phthalic anhydride was heat treated for 500 hours at 200° C. the weight loss was 5.2%. It will thus be seen that a particular advantage attaches to the present materials in this respect.

The exposed surfaces of the test samples shown in Table V above were black in color but the samples were not cracked or distorted in any way and they had excellent adhesion to the aluminum dishes. The surface areas of the samples next to the aluminum dishes were tan in color and on breaking it was observed that the blackening was only on the surface which had been exposed to air.

Compositions containing respectively 10 parts by weight, 30 parts by weight and 80 parts by weight of boron oxide for each 100 parts by weight of Epon 828 prepared in the form of test pieces, ⅛″ thick, were heat treated at 150° for 24 hours and tested for arc resistance and dielectric strength according to ASTM Test Method No. D495–48T. The arc resistance of the samples ranged from about 135 seconds to 180 seconds and the dielectric strength from 300 to 400 volts per mil, there being no distinct difference between the various formulations. A composition containing 50 parts by weight of boron oxide, 100 parts by weight of epoxy resin, Epon 828, and 50 parts by weight of a talc filler had after 50 days at 250° C. an arc resistance which ranged from about 50 to 182 seconds for three samples tested.

The compositions of the present invention are flame resistant or self extinguishing in nature. When tested according to ASTM D–3635–44, a composition containing five parts of boron oxide to 100 parts of resin proved to be flame resistant. A composition containing 20 parts of boron oxide per 100 parts of the same resin was self extinguishing in nature.

Compositions of this invention appear to be little, if any, affected by water. Copper bars about ¼″ square were wrapped with 10 mil glass tape in half-lapped fashion. The bars so prepared were dip coated in pyromellitic dianhydride-Epon 828 resin composition until a build of approximately 60 mils was obtained on each side of the bar. Other bars were dipped in a boron oxide-epoxy resin composition to the same build, the bars, all being then placed in water at room temperature so that only the insulation was exposed to the water. Insulation resistance readings were then made between the copper bar and the water. After two weeks compositions cured with boron oxide had infinite insulation resistance as did those cured with pyromellitic dianhydride. The above copper bar test was repeated except the copper bars were bent into a U shape before insulating so that condensation could not form on the exposed areas and cause creepage failures across the insulated surface instead of through the insulating medium. Both sets of insulated bars, that is those having epoxy resin cured with boron oxide and those cured with pyromellitic dianhydride gave infinite insulation resistance readings when they were initially dipped in boiling water. After being in boiling water for one hour, the boron oxide hardened epoxy resins had an insulation resistance reading of 30 megohms while that for the pyromellitic dianhydride cured epoxy resin was 13 megohms.

From the above, it appears conclusively that boron oxide cured epoxy resins compare favorably to epoxy resins cured with other materials with respect to moisture resistance.

Compositions of boron oxide and epoxy resins can be combined with other of the usual types of epoxy resin curing agents such as phthalic anhydride, pyromellitic dianhydride and maleic anhydride, as well as amine curing agents to produce cured epoxy resins having a wide range of desired characteristics. Epoxy resin compositions of this invention are useful both as potting compounds and for molding purposes. When dissolved in suitable well known solvents, they are useful as impregnants for fibrous materials, as adhesives and as binders for laminates and other structures. Since boron oxide is soluble in the various alcohols, solutions of the composition can readily be deposited on fabrics such as those made of glass fiber to produce salutary insulating materials. Since the compositions are characterized by very low shrinkage, they are particularly useful for making plastic tools. They can be filled with the usual fillers in varying amounts to give compositions tailored to suit any particular need. They are useful either filled or unfilled as coating materials or electrical insulation for wires or electrical conductors which are required to have certain specific characteristics at particular temperatures and especially at elevated temperatures.

While the stated pot life of the present compositions of 2 or 3 days is in fact rather short, it has been noted that the resin compositions convert into a gel state which cures almost immediately when subjected to heat. However, without heating, a further curing of the gelled resin mixtures progresses very slowly so that it does not become hard until after several weeks. These compositions of matter, both filled and unfilled, are useful as coating materials, casting resins, potting resins and electrical insulation.

What I claim as new and desire to secure by Letters Patent of the United States is:

1. A composition of matter comprising by weight (1) 100 parts of a complex epoxide resin obtained by reacting a member of the group consisting of a polyhydric alcohol and a polyhydric phenol with an epihalohydrin, said product having more than one epoxy group per molecule, and (2) from 30 to 80 parts of boron oxide.

2. A composition of matter obtained by heating a mixture of ingredients comprising by weight (1) 100 parts of a complex epoxide resin obtained by reacting a member of the group consisting of a polyhydric alcohol and a polyhydric phenol with an epihalohydrin, said product having more than one epoxy group per molecule, and (2) from 30 to 80 parts of boron oxide.

3. A composition of matter obtained by heating a mixture of ingredients comprising 100 parts of (1) a complex epoxide resin comprising essentially a polyether derivative of a polyhydric phenol, said derivative containing 1,2-epoxy groups and obtained by reacting bis-(4-hydroxy phenol)-2,2-propane and epichlorohydrin, and from about 30 to 80 parts of (2) boron oxide.

4. A shaped article comprising a heat-treated product of a mixture of ingredients comprising by weight (1) 100 parts of a complex epoxide resin obtained by reacting a member of the group consisting of polyhydric alcohol and a polyhydric phenol with an epihalohydrin, said product having more than one epoxy group per molecule, and (2) from about 30 to 80 parts of boron oxide.

5. An article of manufacture comprising a laminated product composed of a plurality of sheets coated with a mixture of ingredients comprising by weight (1) 100 parts of a complex epoxide resin obtained by reacting a member of the group consisting of a polyhydric alcohol and a polyhydric phenol with an epihalohydrin, said product having more than one epoxy group per molecule, and (2) from about 30 to 80 parts of boron oxide.

6. The process which comprises (a) forming a mixture of ingredients comprising by weight (1) 100 parts of a complex epoxide resin obtained by reacting a member of the group consisting of a polyhydric alcohol and a polyhydric phenol with an epihalohydrin, said product having more than one epoxy group per molecule, and (2) from about 30 to 80 parts of boron oxide, and (b) heating the above mixture for a time and at temperature to effect intercondensation between the ingredients.

7. A composition of matter comprising by weight (1) one part of a complex epoxide resin obtained by reacting a member of the group consisting of a polyhydric alcohol and a polyhydric phenol with an epihalohydrin, said resin having more than one epoxy group per molecule, and (2) from 0.3 to 0.8 part of boron trioxide.

References Cited in the file of this patent

UNITED STATES PATENTS 2,752,269    Condo et al. _____ June 26, 1956

Erratum

The dedication shown below failed to appear in the Official Gazette of January 15, 1963.

3,073,799.—*Russell A. Skiff*, Whittier, Calif. RESIN COMPOSITIONS AND THEIR PREPARATION. Patent dated Jan. 15, 1963. Dedication filed Mar. 23, 1962, by the assignee, *General Electric Company*.

Hereby dedicates to the Public the entire term of said patent.
[*Official Gazette October 8, 1968.*]